March 1, 1960 E. FAIRSTEIN 2,927,165

NON-BLOCKING STABILIZED FEED BACK AMPLIFIER

Filed Jan. 25, 1955 2 Sheets-Sheet 1

INVENTOR.
Edward Fairstein
BY
Roland A. Anderson
ATTORNEY

March 1, 1960 E. FAIRSTEIN 2,927,165

NON-BLOCKING STABILIZED FEED BACK AMPLIFIER

Filed Jan. 25, 1955 2 Sheets-Sheet 2

INVENTOR.
Edward Fairstein
BY
Roland A. Anderson
ATTORNEY 2,927,165
Patented Mar. 1, 1960

2,927,165

NON-BLOCKING STABILIZED FEED BACK AMPLIFIER

Edward Fairstein, Oak Ridge, Tenn., assignor to the United States of America as represented by the United States Atomic Energy Commission Application January 25, 1955, Serial No. 484,086
1 Claim. (Cl. 330—96)

My invention relates to feed back amplifiers and more particularly to a plural stage degenerative feed back amplifier having better overload characteristics and increased linearity in its operation.

Heretofore in the prior art, the conventional feed back amplifier had generally been limited to two stages of amplification in the feed back loop, or two stages of amplification followed by a cathode follower. This practice has generally been based upon phase shift considerations, since each stage of amplification may result in a maximum phase shift of 90°, and excessive phase shift resulting from cascading further stages could impair the operation of the system.

Since the number of amplifiers in the feed back loop are limited relatively large grid resistors are employed in the inputs of the stages of the amplifier in order to avoid a reduction in gain. This results in blocking when the signals passing through the amplifier are of sufficient magnitude to produce grid current flow. Other problems which arise in the convention feed back amplifiers result from the fact that the circuit becomes unstable when the high frequency time constant in the amplifier stages approaches the high frequency time constant of the cathode follower, capacitive loading on the output of the cathode follower causes instability by making the time constant of the cathode follower approach the time constant of the amplifying stage, and, when an attempt is made to decrease the non-linearity of the output stage by an increase of the feed back, stability against oscillation is decreased.

Applicant with a knowledge of these problems of the prior art has for an object of his invention the provision of a feed back amplifier which has a short recovery time.

Applicant has as another object of his invention the provision of a feed back amplifier which improves amplifier stability by employing smaller grid resistors while preserving the gain inside the feed back loop.

Applicant has as another object of his invention the provision of a feed back type of amplifier wherein at least three stages of amplification are cascaded in the feed back group, while obviating the harmful effects of phase shift which customarily accompany or result from such an arrangement.

Applicant has as another object of his invention the provision of an amplifier for a feed back group wherein capacitive loading on its output improves the stability.

Applicant has as a further object of his invention the provision of a feed back amplifier having a series of stages whose gains are so proportioned as to compensate for non-linearity.

Other objects and advantages of my invention will appear in the following specification and accompanying drawings, and the novel features thereof will be particularly pointed out in the annexed claim.

Figure 1:
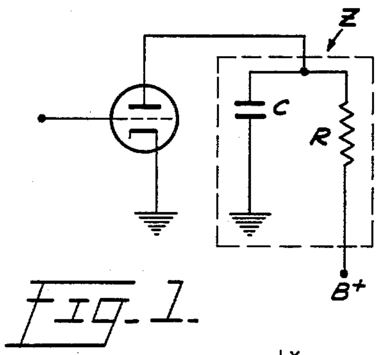
Figure 2:
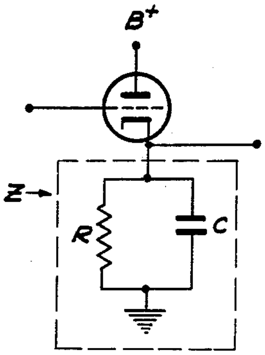
Figure 3:
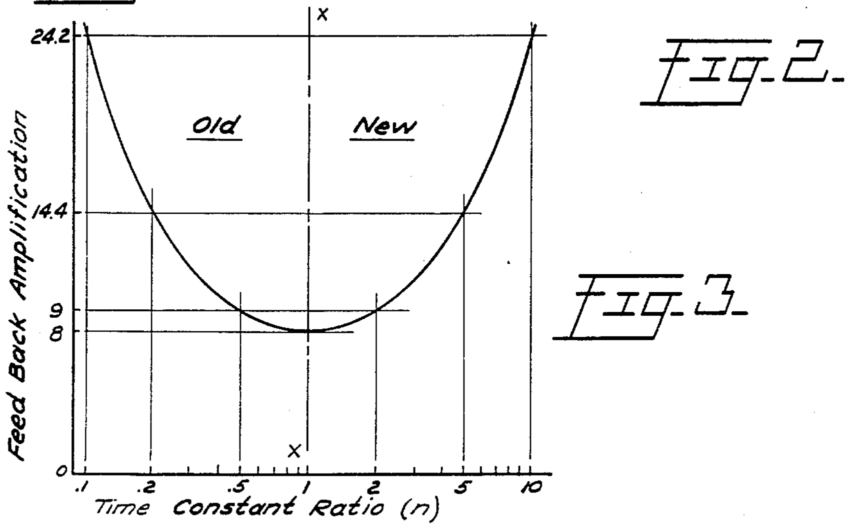
Figure 4:
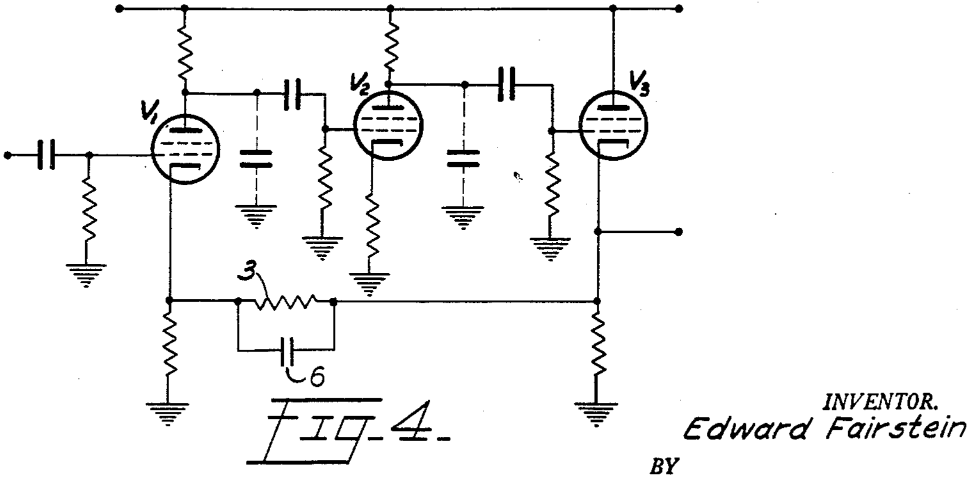
Figure 5:
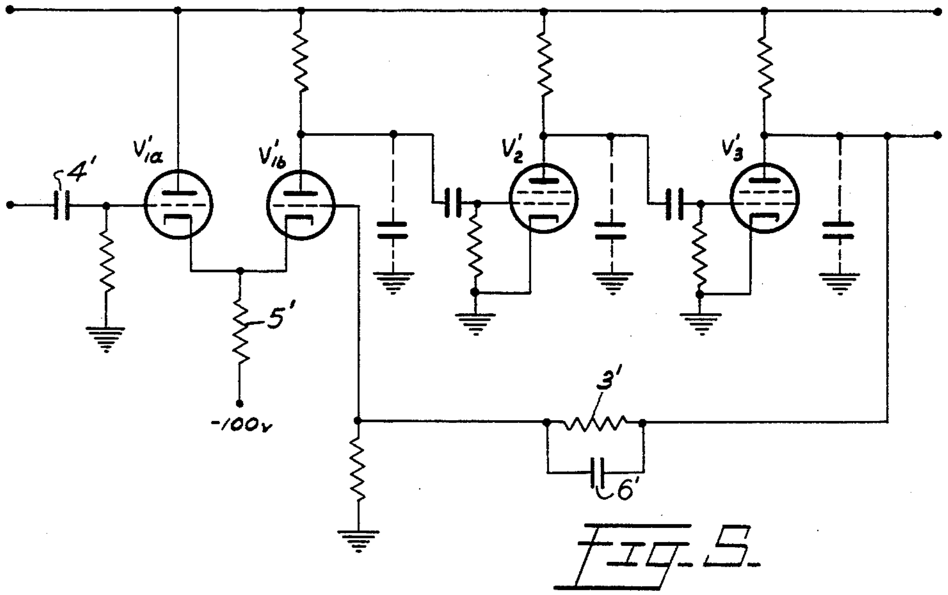

In the drawings, Figure 1 is a schematic of a conventional single stage amplifier. Figure 2 is a schematic of a conventional cathode follower. Figure 3 is a graph of time constant ratio plotted against feed back factor indicating maximum permissible feed back amplification. Figure 4 is a schematic of the circuit of a conventional feed back amplifier. Figure 5 is a schematic of applicant's improved feed back amplifier.

It is a well-known characteristic of the conventional feed back amplifier that it cannot tolerate overload because the tubes receiving positive signals tend to draw grid current, and this results in blocking.

Vacuum Tube Amplifiers, Valley and Wallman, published by McGraw-Hill Book Company, New York, N. Y., pages 113, 116 and 117.

Blocking can be minimized by reducing the size of the grid leak resistor, but this introduces two problems: (1) it reduces the gain inside the feed back loop, (2) then the restoration of the original feed back tends to make the feed back loop, including the amplifying stages and the feed back network, unstable.

It should be noted that the term "instability" as used in this application refers to a tendency for the feed back group to go into an uncontrolled oscillating state.

In addition, to the blocking problem, it is observed that the capacitive loading at the output of a conventional feed back group tends to make it unstable.

Also, the non-linearity of the amplifier for large signals which customarily exists in the output stage can only be partially overcome by increasing the feed back because the maximum permissible value of the feed back factor is limited by the stability criterion.

Applicant has overcome these obstacles by providing a feed back circuit with three stages of amplification within the feed back group, and employing grid resistors of low value compared to the plate load resistors which precede them. This arrangement serves to overcome the problem of blocking while the additional stage overcomes the loss in gain which normally results in the use of small grid resistors. Further, in this arrangement, the reduction of the size of grid resistors is employed to increase stability against oscillation.

In addition to the foregoing, capacitive loading at the output in this arrangement tends to increase the stability of the feed back group.

Non-linearity can be compensated for by properly proportioning the stage gains to give an improvement of at least ten times over that of a conventional feed back amplifier for a given feed back factor.

In the conventional amplifier of Figure 1, the gain can be approximated by the equation:

$$\text{gain} = G_m Z$$

In the above equation $G_m$ is the transconductance of the tube, and Z is the parallel RC combination, where R is the plate load resistor and C is made up of the output capacity of the tube, the input capacity of the following tube, and the parasitic capacity of the wiring to ground.

In the conventional cathode follower circuit of Figure 2, the gain may be approximated by the equation:

$$\text{gain} = \frac{G_m Z}{1 + G_m Z}$$

In the foregoing equation, Z is a parallel RC combination, where R is the cathode resistor and C is both the cathode to ground capacitance of the tube and any other capacitance which might be connected to the circuit.

The impedance of a parallel RC circuit as a function of frequency may be represented by the equation:

$$\frac{R}{1 + J\omega RC}$$

In this equation J is equal to $\sqrt{-1}$ and $\omega$ is equal to $2\pi f$. Thus, the gain of an amplifying stage, of the type of Figure 1, can be written as:

$$\frac{G_m R}{1+J\omega RC}$$

and the gain of a cathode follower as:

$$\frac{G_m R}{1+G_m R} \times \frac{1}{1+J\omega R'C}$$

In the above equation, R' is approximately equal to $$\frac{1}{G_m}$$

For three stages of amplification in cascade, the gain can be written as:

$$\text{Gain}=\frac{A}{(1+J\omega T_1)(1+J\omega T_2)(1+J\omega T_3)} \quad \text{Eq. (1)}$$

In the above, $T_1=R_1C_1$, $T_2=R_2C_2$, $T_3=R_3C_3$, and $A=a_1.a_2.a_3=G_{m1}R_1.G_{m2}R_2.G_{m3}R_3$, or for a cathode follower as the last stage it may be written:

$$a_1\cdot a_2\cdot a_3\cdot=G_{m1}R_1\cdot G_{m2}R_2\cdot\frac{G_{m3}R_3}{1+G_{m3}R_3}$$

In the latter equation $$T_3=\frac{C_3}{G_{m3}}$$

In the above equation the numeral subscripts refer to the particular stage in order.

It can be assumed that the first two stages have equal load so that:

$$T_1=T_2=T$$

The third stage has a load different from T so that:

$$T_3=nT$$

$n$ is a parameter which may be any number greater than zero.

Eq. (1) can be reduced to:

$$\frac{A}{[1-(\omega T)^2(2n+1)]+J\omega T[2+n-n(\omega T)^2]} \quad \text{Eq. (2)}$$

For all feed back amplifiers the overall gain can be written as:

$$\text{Overall gain}=\frac{K}{1+K\beta} \quad \text{Eq. (3)}$$

Where K, represented by Eq. 2, is the gain of the amplifier as a function of frequency, and $\beta$ is the fraction of the output voltage feed back to the input. $(1+K\beta)$ is the feed back factor. Substituting Eq. 2 into Eq. 3 for K and reducing, the following equation is arrived at:

$$\text{Overall gain}=\frac{A}{[1+A\beta-(\omega T)^2(2n+1)]+J\omega T[2+n-n(\omega T)^2]} \quad \text{Eq. (4)}$$

The system is unstable i.e. will oscillate if the denominator is zero. For the denominator to be zero each of the bracketed expressions must be equal to zero, that is:

$$2+n-n(\omega T)^2=0 \quad \text{Eq. (5)}$$

and $$1+A\beta-(\omega T)^2(2n+1)=0 \quad \text{Eq. (6)}$$

Solving Eq. 5, it is found that:

$$(\omega T)^2=\frac{2+n}{n}$$

Substituting the above result in Eq. (6) for $(\omega T)^2$ and solving for A$\beta$, the following is obtained:

$$A\beta=2\left(n+\frac{1}{n}+2\right)$$

The above value for A$\beta$ represents the maximum value it can assume before oscillations will occur in the feed back group. In this equation, $n$ represents the ratio of the time constant in the third stage to the time constant in the first two stages. It will be recalled that the time constant of the first stage was made equal to that of the second stage. Now if $n$ is assigned values from .1 to 10, the maximum A$\beta$ permissible before oscillation occurs can be determined from the following table from which the graph of Figure 3 was taken:

*Table I*

| $n$: | A$\beta$ maximum |
|---|---|
| 10 | 24.2 |
| 5 | 14.4 |
| 2 | 9 |
| 1 | 8 |
| .5 | 9 |
| .2 | 14.4 |
| .1 | 24.2 |

From the graph of Figure 3 it will be observed that the curve is symmetrical about the value of $n=1$. It will also be noted that the abscissa is to a logarithmic scale.

In the conventional two stage and cathode follower group, $n$ is usually about .1, that is, the time constant in the cathode follower circuit is usually .1 times the time constant in the two amplifying stages. If the capacitive loading on the cathode follower is increased, or if the grid resistors are decreased in value, than $n$ increases. Evidently, the feed back group is made less stable by doing the foregoing.

On the other hand, in applicant's amplifier the value for $n$ is about 10. Increasing the capacitive loading on the output stage or decreasing the value of the grid resistors further increases the value of $n$, increasing the stability of the amplifier.

It will be noted that the conventional amplifier operates in a region to the left of the line of symmetry in the graph of Figure 3, while the new amplifier operates in the region to the right of this line. Since increasing the capacitive loading on the output or decreasing the value of the grid resistors always shifts the value of $n$ to the right along the curve, it is clear that it is desirable to operate on that portion of the curve lying to the right of the line of symmetry, designated X—X.

Feed back is used to stabilize the amplifier against drift in tube characteristics, changes in line voltage, and to improve the frequency response and reduce non-linearity of output. The improvement is proportional to the feed back, but results in a loss in gain which is proportional to the feed back. In a practical amplifier, the feed back is chosen to be 10 or greater. The value actually chosen represents a compromise between the desired stability and the number of tubes required for a given amplifier. The choice of feed back determines the region of operation in the graph of Figure 3.

Referring to Figure 4, the conventional feed back amplifier is shown. This may be one of several feed back groups in a larger amplifier system. It includes a pair of amplifiers $V_1$ and $V_2$, cascaded in the feed back loop and arranged to feed into a cathode follower $V_3$. The stages of amplification are coupled by conventional resistance-capacitance coupling. The cathode follower $V_3$ is then coupled through its cathode resistor 3 and trimmer condenser 6 to the cathode of amplifier $V_1$. Assuming that a positive pulse is applied to the grid of tube $V_1$, through the coupling condenser, this will produce a negative pulse on the grid of $V_2$ and a positive pulse at the plate of $V_2$ and on the cathode of $V_3$, which is the output terminal of the feed back group. Tubes $V_1$ and $V_3$ have positive signals applied to their grids and are therefore subject to blocking.

A signal which exceeds about five volts will cause grid current to flow in tube $V_1$, while the feed back group (not shown) which precedes this group may be capable of producing a positive output signal of fifty volts.

In the output group of an amplifier system, $V_2$ may be required to produce signals of 100 volts or more in amplitude. The change in current in $V_2$ which accompanies this large signal causes a change in the amplification of this tube with the result that the output is a non-linear function of the input. The feed back, of course, reduces this effect by the amount of the feed back. But in many cases the remaining non-linearity is still excessive.

At first glance, it would appear that the non-linearity in the first tube could be used to compensate for the non-linearity in the second, since, for instance, the current through tube $V_1$ increases while the current through tube $V_2$ decreases. In this type of circuit, however, the amplification of $V_1$ is approximately the same as that of $V_2$ with the result that the current through $V_1$ changes by an amount equal to $$\frac{1}{a}$$

where $a$ is the amplification of the tube $V_2$. In order for non-linearities to cancel, the current change through tubes $V_1$ and $V_2$ would have to be of the same magnitude. This is incompatible with the operating characteristics of that circuit.

Referring to applicant's improved feed back circuit of Figure 5, it is to be noted that tube $V'_{1a}$ with its coupling resistor 5' in the cathode circuit acts as a cathode follower which is outside of or precedes the feed back group. The feed back group includes tubes $V'_{1b}$, $V'_2$ and $V'_3$, and all are connected as amplifiers. In this arrangement, tube $V'_{1b}$ coupled through cathode resistor 5' functions as a cathode coupled amplifier and the polarity of signal applied thereto is not altered. This amplifier is coupled in turn through resistance-capacitance coupling to the tube $V'_2$, and this amplifier is in turn coupled in the same manner to tube $V'_3$. The output of tube $V'_3$ is then coupled back through resistor 3' and conventional trimmer condenser 6', to the grid of tube $V'_{1b}$ completing the feed back group. A positive signal applied through the condenser 4' to the grid of tube $V'_{1a}$ results in a positive signal at the plate of tube $V'_3$, which is the output of the feed back group.

Tube $V'_{1a}$ will not draw grid current until the input signal exceeds 100 volts or more. If the output of the preceding feed back group is limited to less than 100 volts, blocking can never occur in tube $V'_{1a}$. Grid current does not flow in tube $V'_{1a}$ because with large signal inputs, tube $V'_{1b}$ is cut off, leaving tube $V'_{1a}$ with a cathode load of, for example, 10,000 ohms (an impedance fifty times that of tube $V_1$ of Figure 4). In general, the current a tube will draw when a given signal is applied to its grid circuit is inversely proportional to the size of the cathode resistor used. If with a given signal applied to the grid, the tube can draw the necessary current without going into the positive grid region, no grid current will flow.

The above result would not be obtained in the circuit of Figure 4 if a cathode follower were to precede tube $V_1$, because the tube $V_1$ instead of being cut off by a large positive signal, would present a low resistance load to the cathode follower.

In the normal operation of the circuit of Figure 5, the tube $V'_2$ operates at a much lower gain than the tube $V'_3$. Because of this fact, it is possible to make the current change in tube $V'_2$ equal and opposite to that of tube $V'_3$, as the output voltage goes from zero to its maximum value. When this occurs, the non-linearity of tube $V'_3$ is cancelled by that of tube $V'_2$, resulting in improved linearity over that of the conventional feed back group.

From the foregoing, it is apparent that the grid resistors of tubes $V'_2$ and $V'_3$ in Figure 5 may be approximately 5000 ohms (and will largely determine the gain of the amplifier tube which transmits signals to them) while in the arrangement of Figure 4, the grid resistors of tubes $V_2$ and $V_3$ may be approximately one megohm (and therefore have negligible effect upon the tubes which transmit signals to them). The low valued grid resistors in the circuit of Figure 5 prevent blocking effects under overload conditions, while the high valued grid resistors in the circuit of Figure 4 enhance blocking effects under those conditions.

It will be understood that in the arrangement of Figure 5 the grid resistor of the resistance-capacitance net works for coupling the stages in the cascade is made low in value compared to the previous stage plate load resistor. This tends to increase stability and reduce blocking.

Having thus described my invention, I claim:

A pulse type, non-blocking, stabilized degenerative feed-back amplifier comprising three plate amplifying stages, each of said stages having a tube with at least a cathode, grid and plate, and a load resistor in its plate circuit; a resistor-capacitor coupling network between each stage for connecting the stages in cascade, the capacitor of said network being directly connected between the plate of the preceding tube and the grid of the following tube and the resistor of said network being connected as the grid leak resistor of the following stage, said grid leak resistor being of low resistance when compared to the resistance of the load resistor in the preceding stage; a cathode follower driver for feeding signals to said group, said driver coupled to the cathode of the first of said amplifying stages, a grid leak resistor in said first amplifying stage; and a degenerative feed-back circuit resistance coupling the plate output of the last of said stages to the grid of the first of said stages; the last of said amplifying stages having a time constant greater than the time constants of the other of said stages, where the time constant is determined by the product of the plate load resistance and the effective plate circuit capacitance of the stage, operating potentials applied to said stages and driver.

References Cited in the file of this patent

UNITED STATES PATENTS

| | | |
|---|---|---|
| 1,953,462 | Bone | Apr. 3, 1934 |
| 2,080,204 | Hansell | May 11, 1937 |
| 2,271,197 | Keall | Jan. 27, 1942 |
| 2,652,459 | White | Sept. 15, 1953 |
| 2,728,876 | Varela | Dec. 27, 1955 |
| 2,747,030 | Nuckolls | May 22, 1956 |

FOREIGN PATENTS

| | | |
|---|---|---|
| 681,344 | Great Britain | Oct. 22, 1952 |
| 1,036,849 | France | Apr. 29, 1953 |